US010146230B2

(12) United States Patent
Nishita (10) Patent No.: US 10,146,230 B2
(45) Date of Patent: Dec. 4, 2018

(54) CONTROL DEVICE, OPTICAL DEVICE, AND CONTROL METHOD FOR TRACKING UNMANNED AERIAL VEHICLE, AND SYSTEM AND PROGRAM THEREFOR

(71) Applicant: TOPCON CORPORATION, Itabashi-ku, Tokyo (JP)

(72) Inventor: Nobuyuki Nishita, Tokyo (JP)

(73) Assignee: TOPCON CORPORATION, Itabashi-Ku, Tokyo (JP)

( * ) Notice: Subject to any disclaimer, the term of this patent is extended or adjusted under 35 U.S.C. 154(b) by 0 days.

(21) Appl. No.: 15/893,986

(22) Filed: Feb. 12, 2018

(65) Prior Publication Data

US 2018/0239368 A1   Aug. 23, 2018

(30) Foreign Application Priority Data

Feb. 22, 2017   (JP) ................. 2017-030898

(51) Int. Cl.
| | |
|---|---|
| G06F 7/00 | (2006.01) |
| G06F 17/00 | (2006.01) |
| G06F 19/00 | (2018.01) |
| G05D 1/10 | (2006.01) |
| G08G 5/00 | (2006.01) |
| H04N 7/18 | (2006.01) |

(52) U.S. Cl.
CPC ............. *G05D 1/101* (2013.01); *G08G 5/003* (2013.01); *H04N 7/185* (2013.01)

(58) Field of Classification Search
CPC ........ G05D 1/101; G08G 5/003; H04N 7/185; B64C 39/024
USPC ......................................................... 701/408
See application file for complete search history.

(56) References Cited

U.S. PATENT DOCUMENTS

| | | | |
|---|---|---|---|
| 2014/0210663 A1 | 7/2014 | Metzler | |
| 2017/0029107 A1* | 2/2017 | Emami | ................. B64C 39/024 |

FOREIGN PATENT DOCUMENTS

| | | |
|---|---|---|
| JP | 2009-229192 A | 10/2009 |
| JP | 2012-202821 A | 10/2012 |

* cited by examiner

*Primary Examiner* — Mahmoud S Ismail
(74) *Attorney, Agent, or Firm* — Chiesa Shahinian & Giantomasi PC (57) ABSTRACT

A technique enables easy recapture of an unmanned aerial vehicle (UAV) that an optical device has lost sight of. A control device controls tracking of the unmanned aerial vehicle. When failing to capture the unmanned aerial vehicle during tracking of the unmanned aerial vehicle, the control device controls processing to transmit a lost signal and controls processing to search for the unmanned aerial vehicle by targeting an airspace containing a location at which the unmanned aerial vehicle was previously captured by the control device.

5 Claims, 5 Drawing Sheets

CONTROL DEVICE, OPTICAL DEVICE, AND CONTROL METHOD FOR TRACKING UNMANNED AERIAL VEHICLE, AND SYSTEM AND PROGRAM THEREFOR

CROSS-REFERENCE TO RELATED APPLICATION

This application is based upon and claims the benefit of priority from Japanese Patent Application No. 2017-030898, filed Feb. 22, 2017, the entire contents of which are incorporated herein by reference.

TECHNICAL FIELD

The present invention relates to a technique for optically tracking an unmanned aerial vehicle while in flight.

BACKGROUND

Technologies using an unmanned aerial vehicle (UAV) in surveying are publicly known. The UAV used in these technologies may be mounted with a location-measuring device using a global navigation satellite system (GNSS) (called a "GPS receiver"), an inertial measurement unit (IMU), an altimeter, and a camera. Such a UAV may be made to photograph the ground while flying along a predetermined path in aerial photogrammetry or in other surveying.

Photogrammetry requiring no airphoto signals or using a reduced number of airphoto signals greatly depends on accuracy of location data of the camera. The UAV can locate its own location using the GNSS, but this locating is independent positioning having a positioning accuracy of approximately 1 meter in a horizontal direction and approximately 3 meters in a vertical direction, which does not achieve the accuracy required in photogrammetry. A UAV may be mounted with a more highly accurate location measuring device that can perform relative positioning using a GNSS. However, this concept is difficult to apply to a general purpose UAV in consideration of weight and electric power consumption of the device. To solve these problems, a total station (TS) may be used to track a UAV in flight and locate the UAV by using its laser distance measuring function (for example, refer to US2014/0210663).

This method of tracking the UAV by the TS uses an automatic target-tracking function of the TS. In this technique, laser light for searching is used to capture and track the UAV. The UAV has a reflective prism that reflects the laser light for searching, back in the incident direction, and the TS detects light reflected from the reflective prism to track the UAV.

BRIEF SUMMARY OF THE EMBODIMENTS

The TS may lose sight of the UAV while tracking the UAV due to a sudden change in location of the UAV caused by wind or due to an obstacle such as a tree branch or a bird in the line of the sight of the TS. The lost UAV may be recaptured by using a searching function of the TS, but the searching function of the TS may still not be satisfactory for recapturing a UAV moving three dimensionally. In view of these circumstances, an object of the present invention is to provide a technique for enabling easy recapture of a UAV that an optical device has lost sight of.

A first aspect of the present invention provides a control device that controls tracking of an unmanned aerial vehicle. When failing to capture the unmanned aerial vehicle during tracking of the unmanned aerial vehicle, the control device controls transmission of a lost signal and controls search for the unmanned aerial vehicle by targeting an airspace containing a location at which the unmanned aerial vehicle was previously captured by the control device.

According to a second aspect of the present invention, in the first aspect of the present invention, the control device may control transmission of an under-capture signal during capture of the unmanned aerial vehicle and may control transmission of a lost signal instead of the under-capture signal when failing to capture the unmanned aerial vehicle.

According to a third aspect of the present invention, in the second aspect of the present invention, the control device may start transmission of the under-capture signal when achieving recapture the unmanned aerial vehicle from a condition of having failed to capture unmanned aerial vehicle.

According to a fourth aspect of the present invention, in any one of the first to the third aspects of the present invention, the lost signal may be transmitted to summon the unmanned aerial vehicle back to the airspace. A fifth aspect of the present invention provides an optical device including the control device according to any one of the first to the fourth aspects of the present invention and a searching part that optically searches for the unmanned aerial vehicle.

A sixth aspect of the present invention provides a control method for tracking an unmanned aerial vehicle. The control method includes, when the unmanned aerial vehicle fails to be captured while being tracked, transmitting a lost signal and searching for the unmanned aerial vehicle by targeting an airspace containing a location of the unmanned aerial vehicle at a time when the unmanned aerial vehicle was under capture.

A seventh aspect of the present invention provides a tracking system for tracking an unmanned aerial vehicle, and the tracking system includes a wireless unit and a searching unit. When the tracking system fails to capture the unmanned aerial vehicle during tracking of the unmanned aerial vehicle, the wireless unit transmits a lost signal, and the searching unit searches for the unmanned aerial vehicle by targeting an airspace containing a location of the unmanned aerial vehicle at a time when the tracking system had the unmanned aerial vehicle under capture.

An eighth aspect of the present invention provides a non-transitory computer recording medium storing computer executable instructions that, when executed by a computer processor in tracking an unmanned aerial vehicle, cause the computer processor to: control, when the unmanned aerial vehicle fails to be captured while being tracked, transmission of a lost signal and search for the unmanned aerial vehicle by targeting an airspace containing a location of the unmanned aerial vehicle at a time when the unmanned aerial vehicle was under capture.

The present invention provides a technique that facilitates recapturing of a UAV that an optical device has lost sight of.

DETAILED DESCRIPTION

Figure 1:
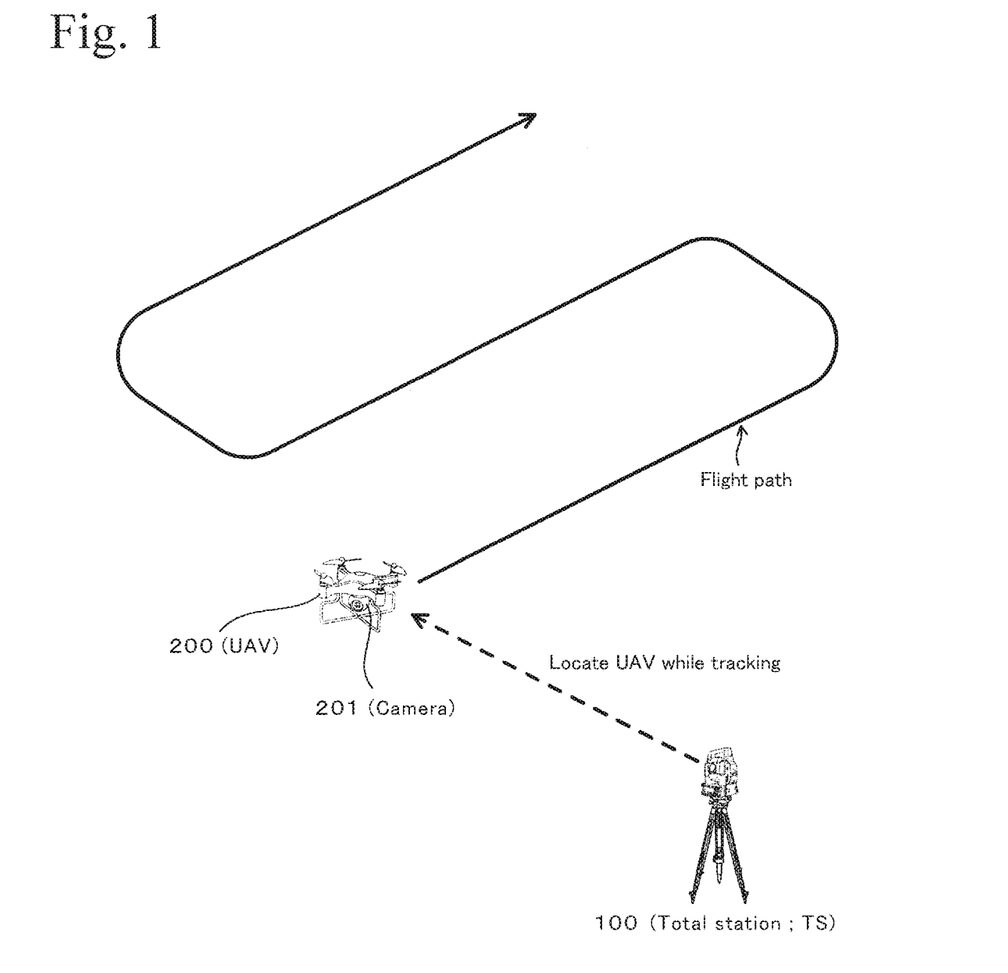
FIG. 1 is a conceptual diagram of an embodiment.

FIG. 1 shows an example of tracking a UAV 200 in fight by a TS 100. The TS 100 and the UAV 200 both have a wireless communicating unit and can communicate with each other. The TS 100 transmits an under-capture signal to the UAV 200 to notify of a state of capture in a condition in which the TS 100 captures the UAV 200. When losing sight of the UAV 200 from the state of capturing the UAV 200, the TS 100 stops transmitting the under-capture signal, and instead, transmits a lost signal to the UAV 200 to notify the UAV 200 of its being lost.

Upon receiving the lost signal, the UAV 200 returns to a flight location "A" (three-dimensional location in the air) that was passed through at which the UAV 200 received the under-capture signal, and then the UAV 200 remains thereat by hovering, flying in circles, or flying in another pattern. On the other hand, after transmitting the lost signal, the TS 100 searches for the UAV 200 by focusing on the location "A" at which the TS 100 had the UAV 200 under capture at a previous time.

For example, upon receiving the lost signal, the UAV 200 returns to a location "A" at which the UAV 200 passed through 5 seconds before receiving the lost signal, and then the UAV 200 hovers thereat. On the other hand, after transmitting the lost signal, the TS 100 searches for the UAV 200 to recapture the UAV 200 by targeting an airspace in which the TS 100 captured the UAV 200 5 seconds before transmitting the lost signal. That is, the TS 100 searches for the UAV 200 by targeting an airspace containing the direction of the UAV 200 at the time when the TS 100 had the UAV 200 under capture, which is 5 seconds before the TS 100 loses the UAV 200 in this embodiment.

This technique uses the lost signal for summoning the UAV 200 back to the airspace containing the location "A". The UAV 200 that has received the lost signal returns to the airspace containing the location "A" at which the UAV 200 was under capture by the TS 100, and then the UAV 200 flies while remaining in this airspace to enable easy recapture of the UAV 200. This airspace containing the location "A" is where the TS 100 previously captured the UAV 200, and the TS 100 knows the direction of the airspace. Thus, the target to be searched for the UAV can be narrowed down to the airspace, thereby increasing the probability of recapturing the lost UAV 200.

TS

The TS has a location measuring device using a GNSS, a camera for obtaining images, a laser scanning function for searching for a target (a reflective prism of the UAV), a laser distance measuring function for measuring a distance to the target by using distance-measuring laser light, a measuring function for measuring the direction (a horizontal angle and a vertical angle, which is an elevation angle or a depression angle) of the target of which the distance is measured by using the laser light, and a function for communicating with the UAV.

Measuring the distance and the direction of the target provides the location of the target relative to the TS 100. When the location of the TS 100 is known, the location of the target (here, the UAV 200) in a map coordinate system (latitude, longitude, and altitude) or in an orthogonal coordinate system (XYZ coordinates) is determined. This function is normally provided to a commercially available TS and is not special. The technique relating to the TS may be found in Japanese Unexamined Patent Applications Laid-Open Nos. 2009-229192 and 2012-202821, for example. The map coordinate system describes map information (for example, latitude, longitude, and altitude or elevation). For example, location information obtained from the GNSS is normally described in the map coordinate system.

Figure 2:
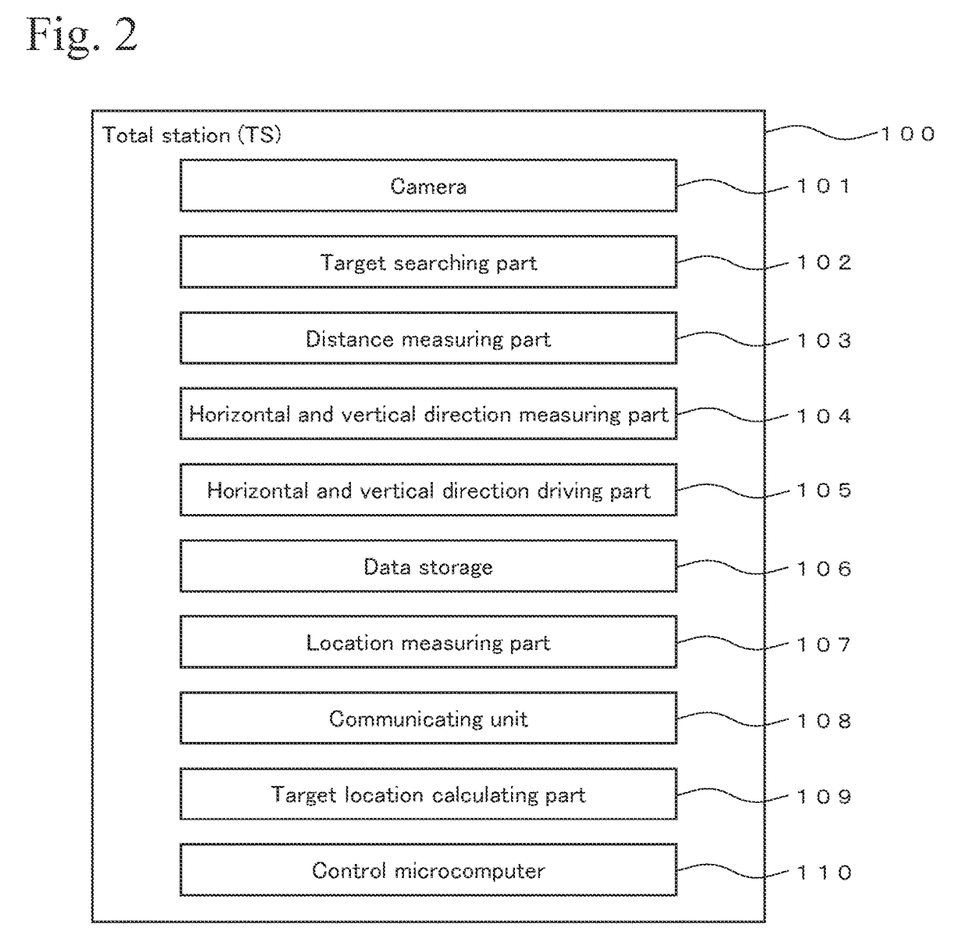
FIG. 2 is a block diagram of a TS of the embodiment.

Hereinafter, an example of the TS 100 used in this embodiment will be described. FIG. 2 shows a block diagram of a TS 100. The TS 100 includes a camera 101, a target searching part 102, a distance measuring part 103, a horizontal and vertical direction measuring part 104, a horizontal and vertical direction driving part 105, a data storage 106, a location measuring part 107, a communicating unit 108, a target location calculating part 109, and a control microcomputer 110.

The camera 101 is configured by using a camera module such as a CCD image sensor or a CMOS image sensor. The communicating unit 108 is configured of a wireless module constructed of dedicated hardware. The other functional components shown in FIG. 2 may be constructed of pieces of dedicated hardware or may be constructed of pieces of software by using a microcomputer. Examples of hardware that implements the components shown in FIG. 2 may include various types of electronic devices such as a camera module for the camera and a wireless module for the communicating unit 108, various kinds of driving mechanisms using motors or other units, a sensor mechanism, optical parts, various types of electronic circuits, a central processing unit (CPU), an application specific integrated circuit (ASIC), and a field programmable gate array (FPGA). The same or similar configuration of these pieces of hardware also applies to the UAV 200.

The camera 101 photographs moving images or still images of an object to be surveyed, such as the UAV 200 or a target. The data of the images photographed by the camera 101 is stored in the data storage 106 in association with data such as measurement times, measurement directions, measurement distances, locations, and other parameters, of the object, for which distance is to be measured.

The target searching part 102 searches for the target (UAV 200) by using laser light for searching, which is composed of triangular pyramid-shaped or fan-shaped beams. In this embodiment, the target searching part 102 has an emitting optical system to emit searching light having fan-shaped beams and has a light receiving system to receive the searching light reflected from the object. The target is searched for by setting a reference location at the TS 100. Publicly known techniques relating to the mechanism for searching for the target may be found in Japanese Unexamined Patent Applications Laid-Open Nos. 2009-229192 and 2012-202821, for example.

The distance measuring part 103 measures a distance to the target by using distance-measuring laser light. The horizontal and vertical direction measuring part 104 measures a horizontal angle and a vertical angle (elevation angle or depression angle) in a direction directed by the optical system of the target searching part 102 and an optical system of the distance measuring part 103. The optical systems for the target searching part 102 and the distance measuring part 103 are provided to a casing part of which horizontal rotation and elevation or depression angle are controllable. The horizontal angle and the vertical angle are measured by an encoder. The output of the encoder is received by the horizontal and vertical direction measuring part 104, and the horizontal angle and the vertical angle (elevation angle or depression angle) are measured.

The horizontal and vertical direction driving part 105 includes a motor, a driving circuit for the motor, and a controlling circuit for the driving circuit. The motor controls the horizontal rotation, the elevation angle, and the depression angle of the casing part, which has the optical systems for the target searching part 102 and the distance measuring part 103. The data storage 106 stores control programs necessary for operating the TS 100, various kinds of data, survey results, and other information.

The location measuring part 107 locates the TS 100 by using the GNSS. The location measuring part 107 can perform both of relative positioning and independent positioning. Under circumstances that allow the relative positioning, the location of the TS 100 is preferably measured by the relative positioning. However, in a case in which the relative positioning is difficult to perform, the location of the TS 100 is measured by independent positioning.

The communicating unit 108 communicates with the UAV 200 and an external device. The TS 100 can be controlled by an external terminal, such as a dedicated terminal, a PC, a tablet, a smartphone, or another device, and can communicate with the external terminal by using the communicating unit 108. The communicating unit 108 receives various data necessary for operating the TS 100 and outputs various data obtained from the TS 100 to the outside. The communicating unit 108 also transmits an under-capture signal and a lost signal to the UAV 200. The timing to transmit the under-capture signal or the lost signal will be described later. The communication between the communicating unit 108 and the UAV 200 is performed via wireless communication, and the communication between the communicating unit 108 and the external terminal is performed via wireless communication, optical communication, or wired communication.

The target location calculating part 109 calculates the location (coordinates) of the target (here, the reflective prism mounted on the UAV 200) relative to the TS 100, from the distance and the direction to the target. The distance to the target is obtained by the distance measuring part 103, and the direction of the target is obtained by the horizontal and vertical direction measuring part 104. Since the location of the TS 100 serving as a reference location is identified by the location measuring part 107, the location of the target in the map coordinate system is determined by calculating the location of the target relative to the TS 100. The control microcomputer 110 comprehensively controls the execution of the processing in the flowchart shown in FIG. 5, which will be described later.

UAV

Figure 3:
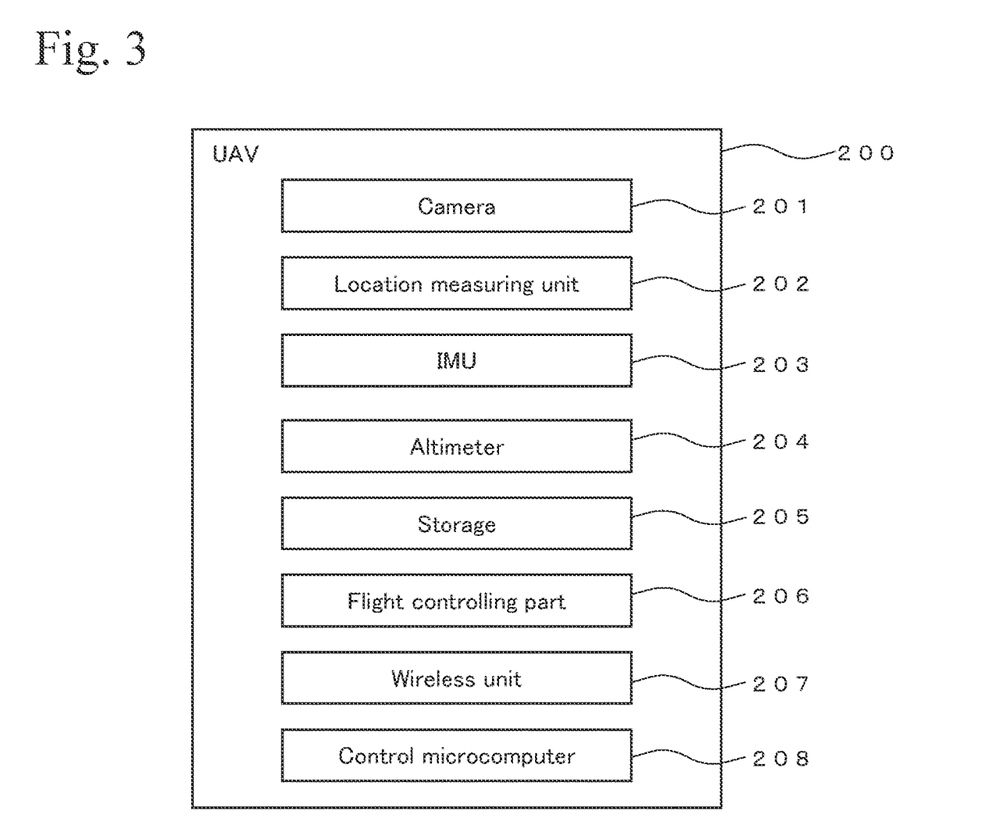
FIG. 3 is a block diagram of a UAV of the embodiment.

FIG. 3 shows a block diagram of the UAV 200. The UAV 200 is a rotary wing vehicle configured to be able to vertically ascend, vertically descend, and hover to remain stationary in the air. The UAV autonomously flies along a predetermined flight path and conducts photographing for aerial photogrammetry. Also, the flight of the UAV 200 can be wirelessly controlled. The UAV 200 includes a camera 201, a location measuring unit 202 using a GNSS (for example, a GPS receiver), an inertial measurement unit (IMU) 203, an altimeter 204, a storage 205 for storing a predetermined flight plan and flight log, a flight controlling part 206 for controlling the flight by controlling the rotation of a rotor and other movement, a wireless unit 207 for communicating with the TS 100, and a control microcomputer 208 for comprehensively controlling the execution of the processing shown in FIG. 4, which is described later.

The UAV 200 flies in accordance with the predetermined flight plan by using the functions of its location measuring unit 202 and its IMU 203. The flight plan specifies the time to start a flight, coordinates (latitude, longitude, and altitude) of multiple points Pn to be passed through, and speeds between adjacent points. The UAV 200 autonomously flies in accordance with this flight plan. The location of the UAV 200 at a specified time is calculated from the location of the point Pn and the flight time. The time to start a flight can be freely selected on site. The flight plan may also specify a relationship between the time and the location from when the flight is started.

The progress of the flight is stored in a flight log file. The flight log file contains information of time and information of location (latitude, longitude, and altitude) and attitude of the UAV 200 in association with each other. The data of the images photographed by the camera 201 is stored in the storage 205 in association with photographing times, and locations (latitude, longitude, and altitude) and attitudes (directions) of the UAV 200 at the photographing times.

The UAV 200 is attached with a dedicated reflective prism at a position that is easy to view from the outside (a position easy for the TS 100 to find, for example, a bottom of the UAV 200). The reflective prism receives and reflects both laser light for searching and distance-measuring laser light from the TS 100. The reflective prism is a dedicated target for surveying to be conducted by the TS 100 and reflects incident laser light back in the incident direction.

Operation of UAV

Figure 4:
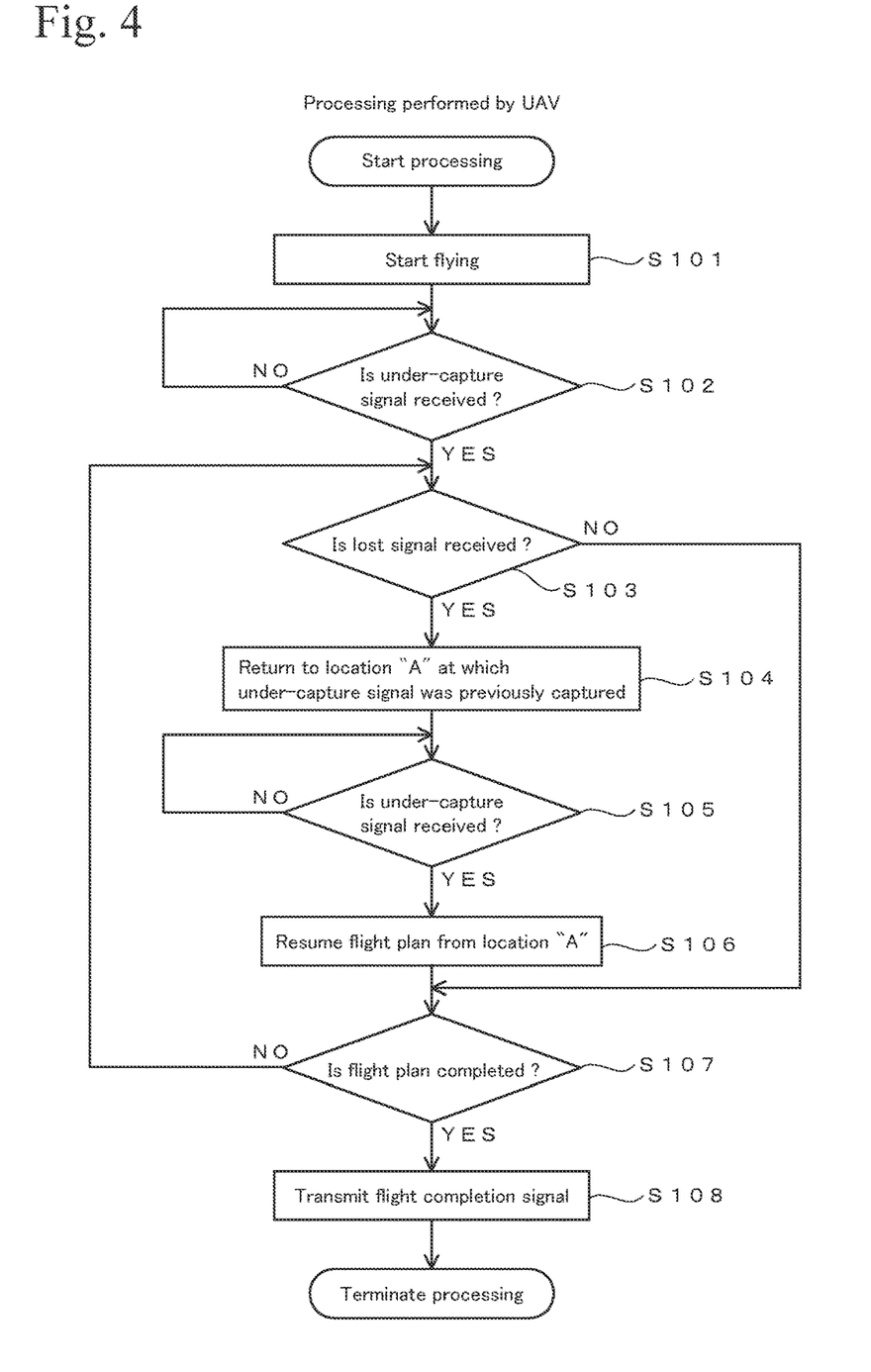
FIG. 4 is a flowchart showing an example of a process performed by the UAV.

FIG. 4 shows an example of a processing procedure performed by the UAV 200. Programs for executing the processing shown in FIG. 4 are stored in the storage 205 and are executed by the control microcomputer 208. These programs may be stored in an appropriate storage medium and may be provided therefrom.

Upon being instructed to start a flight, the UAV 200 starts to fly in accordance with the flight plan (step S101). Simultaneously with the start of the flight, the TS 100 starts to track the UAV 200. At that time, the TS 100 transmits an under-capture signal to the UAV 200 to notify of the capture of the UAV 200 at the stage of capturing the UAV 200.

The UAV 200 that has already started a flight judges whether the UAV 200 receives an under-capture signal from the TS 100 (step S102). If the reception of the under-capture signal is not recognized after a predetermined period has passed, the processing has failed, and the UAV 200 stops its flight and returns to the flight start point.

If the UAV 200 receives the under-capture signal from the TS 100, the UAV 200 continues flying in accordance with the flight plan. Then, the UAV 200 judges whether the UAV 200 receives a lost signal (step S103). The lost signal is transmitted when the TS 100 loses sight of the UAV 200. If not receiving the lost signal, the UAV 200 judges whether the flight plan is completed (step S107). If the flight plan is not completed, the processing in step S103 and the subsequent steps is repeated.

Upon receiving the lost signal, the UAV 200 advances the processing from step S103 to step S104. In response, the UAV 200 returns to the location "A" at the time before receiving the lost signal, that is, at the time when it was receiving the under-capture signal, and then the UAV 200 hovers thereat. This processing is performed by routing back the flight path.

For example, it is assumed that symbol "t0" represents the time when the lost signal is received, that is, the time when the under-capture signal is interrupted. In this case, in a condition in which the location of the UAV 200 at a time "t0−Δt" is represented as a location "A", the UAV 200 returns to the location "A" and hovers thereat (step S104).

The location "A" is already recorded in the flight log file at this time and is a location traced back from the location at the time t0 by the time Δt on a flight trajectory that is obtained from the flight log file. The time Δt is determined in advance, and a time interval similar to or the same as the time Δt is used at the TS 100 side. This function will be described later. The time Δt may include zero seconds (0 seconds).

The UAV 200 continues hovering at the location "A" until receiving the under-capture signal from the TS 100 (step S105). If the UAV 200 does not receive the under-capture signal after a specified time passes from the start of hovering at the location "A", capturing by the TS 100 fails, and the UAV 200 stops its flight and returns to the flight start point.

Upon receiving the under-capture signal in step S105, the UAV 200 resumes its flight from the location "A" in accordance with the flight plan (step S106). Then, the UAV 200 advances the processing to step S107, and if the flight plan is completed, the UAV 200 heads to a landing point specified in the flight plan. After landing, the UAV 200 transmits a flight completion signal (step S108) and terminates the processing. If the flight plan is not completed, the processing in step S103 and the subsequent steps is repeated.

Operation of TS

Figure 5:
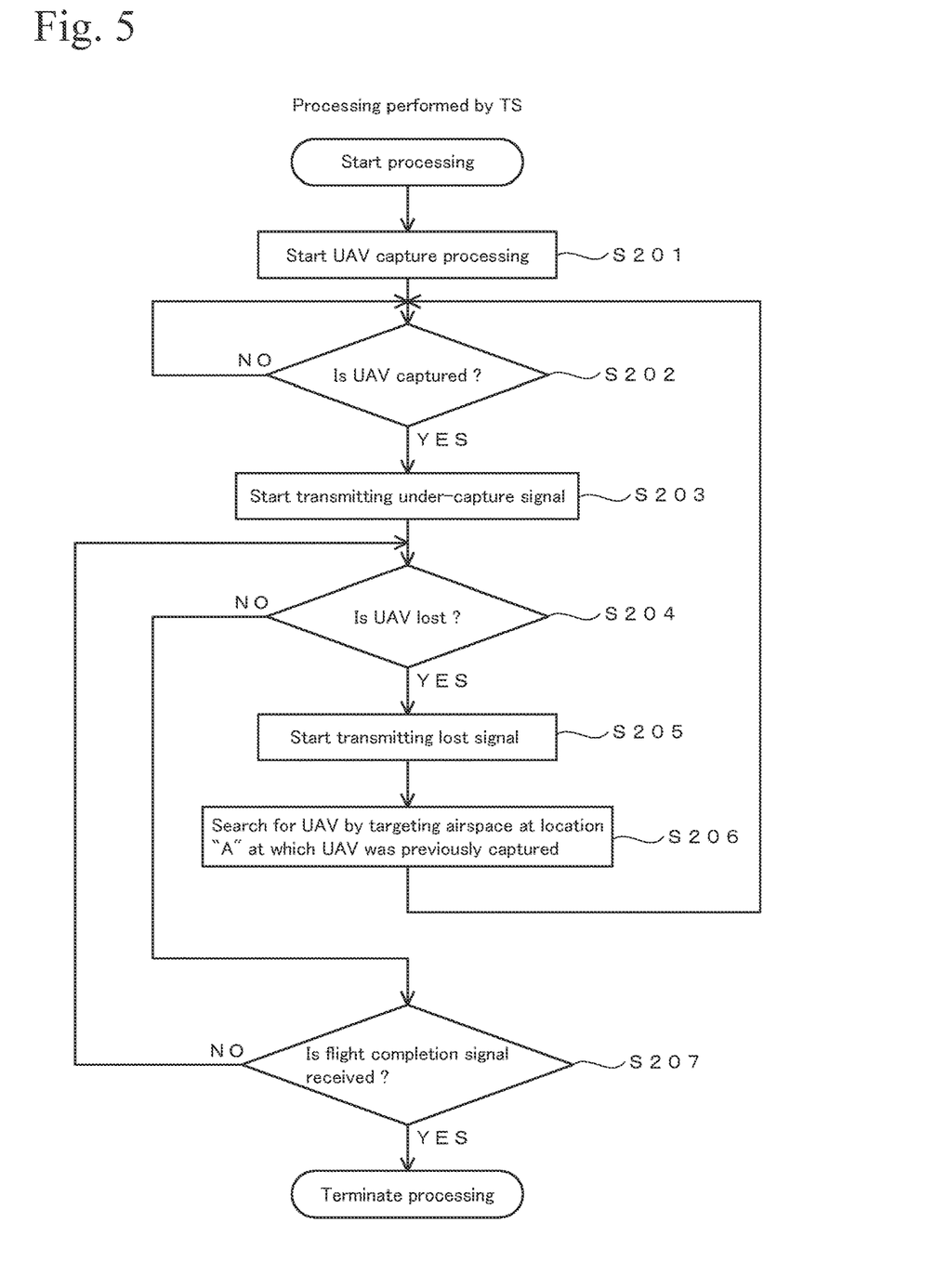
FIG. 5 is a flowchart showing an example of a process performed by the TS.

In response to the start of the flight of the UAV 200, the processing shown in FIG. 5 is started by the TS 100. Programs for executing the processing shown in FIG. 5 are stored in the data storage 106 and are executed by the control microcomputer 110. These programs may be stored in an appropriate storage medium and may be provided therefrom.

First, the TS 100 starts processing to capture the UAV 200 by using its target searching function (step S201). For example, the UAV 200 is first made to ascend and is then made to hover, and the TS 100 performs processing to capture the UAV 200 in this condition. If a continuation time of capturing processing passes a specified time, the capturing has failed, and the TS 100 notifies of the capturing error. In one example, after an optical axis of the TS 100 is directed to the UAV 200 before the UAV 200 starts a flight, and the TS 100 is made to capture the UAV 200 in this condition, the flight of the UAV may be started. This procedure prevents failure in first capture.

After capturing the UAV 200, the TS 100 advances the processing from step S202 to step S203 and starts transmission of the under-capture signal (step S203). The under-capture signal may be continuously transmitted or may be intermittently transmitted. The TS 100 continues measuring the location of the UAV 200 relative to the TS 100 while capturing the UAV 200. In one example, to only monitor the UAV 200 that is flying, the TS 100 does not necessarily measure the location of the UAV 200 and only needs to track the UAV 200.

Thereafter, whether the UAV 200 is lost, that is, whether the TS 100 loses sight of the UAV 200, is judged (step S204). When losing sight of the UAV 200, the TS 100 stops transmission of the under-capture signal and starts transmission of the lost signal (step S205). The lost signal may be continuously transmitted or may be intermittently transmitted.

After starting transmission of the lost signal in step S205, the TS 100 searches for the UAV 200 by targeting the airspace at the flight location "A" at the time when the TS 100 had the UAV 200 under capture (step S206). For example, it is assumed that symbol "t0" represents the time when the TS 100 transmits the lost signal, that is, the time when the TS 100 loses sight of the UAV 200. In this case, in a condition in which the location of the UAV 200 at a time "t0−Δt" is represented as a location "A", the UAV 200 is searched for by referring to the location "A". The location "A" is a location in the air at the time the UAV 200 was under capture. Then, the TS 100 turns its optical axis to the location "A" and searches the airspace containing the location "A" for the UAV 200. As in the above description relating to the operation of the UAV 200, the value of Δt is determined in advance, and this value is similar to or the same as that set at the UAV 200 side.

After step S206, the processing in step S202 and the subsequent steps is repeated. If the UAV 200 is not lost in step S204, the processing advances to step S207. In step S207, the TS 100 judges whether the flight completion signal is received from the UAV 200 (step S207). If the flight completion signal is not received, the processing in step S204 and the subsequent steps is repeated. Otherwise, if the flight completion signal is received, the processing is terminated.

Advantages

As described above, when the TS 100 fails to capture the UAV 200 during tracking of the UAV 200, the control microcomputer 110 controls the processing in step S205 to transmit a lost signal and controls the processing in step S206 to search for the UAV 200 by targeting the airspace containing the location of the UAV 200 at the time the UAV 200 was under capture.

These controls cause the UAV 200 to return to the location "A" at which the UAV 200 was under capture by the TS 100 and cause the UAV 200 to hover thereat, when the TS 100 loses sight of the UAV 200. Meanwhile, the TS 100 searches the location "A" at which the TS 100 had the UAV 200 under capture, to try to recapture the lost UAV 200. At this time, since the UAV 200 hovers at the location "A", the UAV 200 is easily recaptured.

Other Matters

A UAV that is flying must be monitored in some cases. In such cases, the UAV may not necessarily be located, but the UAV must be captured and be locked on to by an optical device such as a TS as in the case described above. The present invention may be used as a technique in such cases.

In the processing shown in FIGS. 4 and 5, to enable the TS 100 to easily capture the UAV 200, the UAV 200 is made to hover. Instead of hovering, since the UAV 200 remaining in a specific airspace is easy to find, the UAV 200 may be made to fly in circles, fly back and forth, fly in a figure-8 course, fly upwardly and downwardly in altitude, or fly in another pattern, in the specific airspace. Under these conditions, the TS 100 may capture and lock on to the UAV 200.

The processing shown in FIGS. 4 and 5 may also be controlled by a personal computer (PC), a tablet, a piece of dedicated hardware, or another device. For example, in a case of using a PC, the PC is connected to the communicating unit and thus communicates with each of the TS and the UAV. Under control of the PC, the processing shown in FIG. 4 is executed at the UAV, and the processing shown in FIG. 5 is executed at the TS. Alternatively, multiple pieces of hardware may perform the processing in a distributed manner and may comprehensively operate as a system. For example, a system performing the processing shown in FIGS. 4 and 5 via communication may be configured by implementing a communication function and a user interface function by a smartphone and by implementing the other functions by a PC, a piece of dedicated hardware, a server, or other device.

What is claimed is:

1. A control device that controls tracking of an unmanned aerial vehicle, wherein, the unmanned aerial vehicle includes a mounted reflective prism, and the control device uses a total station configured to search for the reflective prism by using light for searching, and when failing to capture the reflective prism during searching for the reflective prism by using light for searching, the control device directs an optical axis of the total station to a position of the reflective prism where the reflective prism existed at a time as previously captured by the light used for searching.

2. The control device according to claim 1, wherein the control device starts transmission of an under-capture signal when achieving recapture of the unmanned aerial vehicle from a condition of failing to capture the unmanned aerial vehicle.

3. The control device according to claim 1, wherein the control device transmits a lost signal to summon the unmanned aerial vehicle back to an airspace that contains a location at which the unmanned vehicle was previously captured by the total station.

4. A control method for tracking an unmanned aerial vehicle mounted with a reflective prism, the control method comprising:

using a total station for searching for the reflective prism using light; and when the unmanned aerial vehicle fails to be captured while being tracked by the light used for searching, directing an optical axis of the total station to a position of the reflective prism where the reflective prism existed at a time as previously captured by the light used for searching.

5. A non-transitory computer recording medium storing computer executable instructions for tracking an unmanned aerial vehicle mounted with a reflective prism using a total station configured to search for the reflective prism by using light for searching that, when executed by a computer processor cause the computer processor to perform operations comprising, when the unmanned aerial vehicle fails to be captured while being tracked by the light used for searching, directing an optical axis of the total station to a position of the reflective prism where the reflective prism existed at a time as previously captured by the light used for searching.

* * * * *